Nov. 4, 1924.
R. F. HANCOCK
1,513,756
GLASS BLOWING AND TRIMMING MACHINE
Filed Jan. 29, 1923
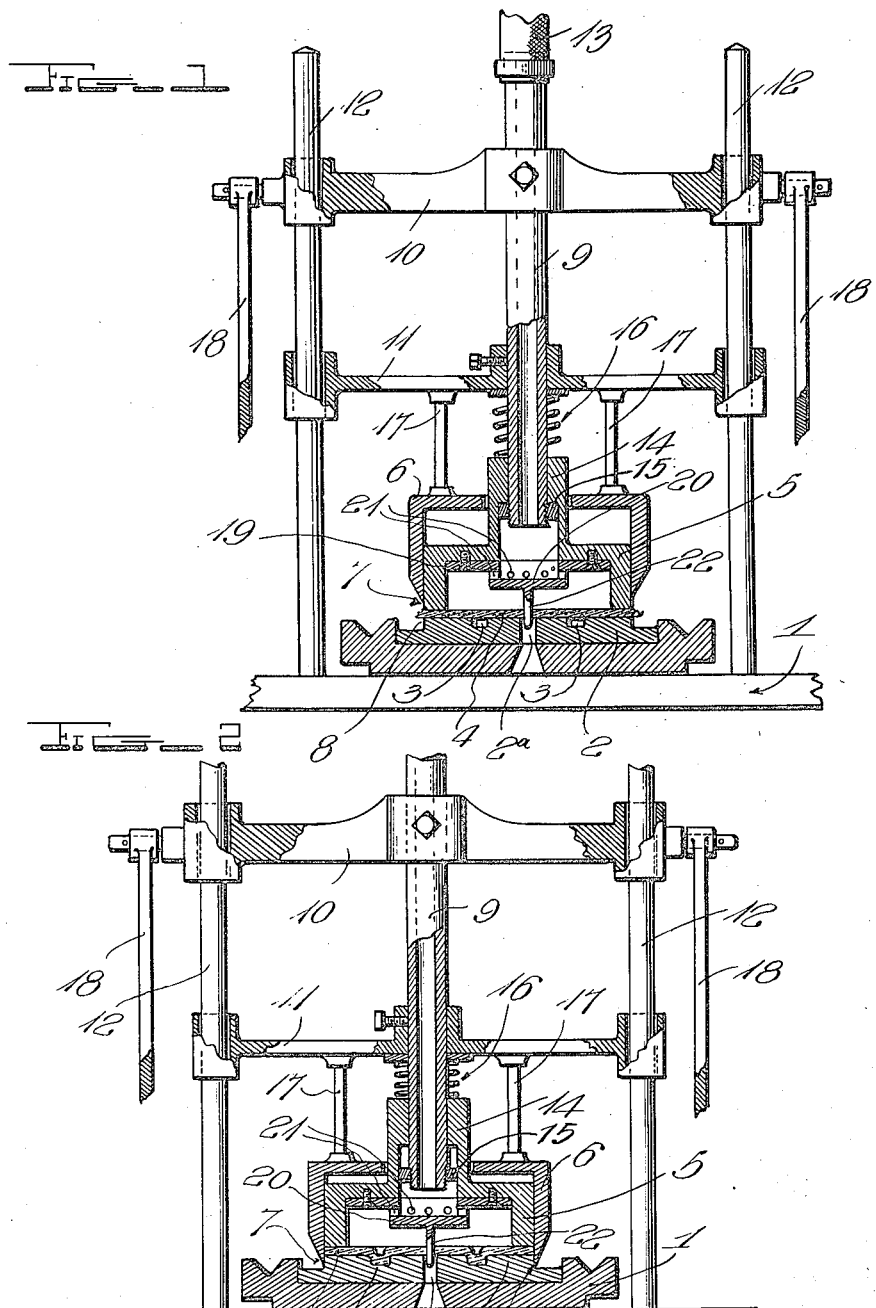
Witness
Inventor
Raymond F. Hancock
By
Attorneys Patented Nov. 4, 1924.

1,513,756

UNITED STATES PATENT OFFICE.

RAYMOND F. HANCOCK, OF MARION, INDIANA, ASSIGNOR TO JAMES BOYCE, OF GIBSON, MICHIGAN, AND HARRY F. ANDERSON, OF MARION, INDIANA.

GLASS BLOWING AND TRIMMING MACHINE.

Application filed January 29, 1923. Serial No. 615,621.

*To all whom it may concern:*

Be it known that I, RAYMOND F. HANCOCK, a citizen of the United States, residing at Marion, in the county of Grant and State of Indiana, have invented certain new and useful Improvements in Glass Blowing and Trimming Machines; and I do declare the following to be a full, clear, and exact description of the invention, such as will enable others skilled in the art to which it appertains to make and use the same.

My invention relates to improvements in machines embodying a blow-head for application to a warm pliable sheet of glass for the purpose of blowing it into conformity with the shape of a die, one object of the invention being to provide a unique form of edge trimmer for the sheet of glass, which surrounds the blow-head.

Another object is to provide unique means for successively moving the blow-head and the edge trimmer to operative positions.

A still further aim is to provide an arrangement of fluid pressure discharge orifices for the blow-head which will not direct the fluid pressure at any centralized point or points upon the glass sheet, but will equally distribute the pressure thereon.

Yet another object is to provide the blow-head with a punch to form an opening in the glass sheet, simultaneously with movement of said blow-head into engagement with the sheet.

With the foregoing in view, the invention resides in the novel subject matter hereinafter described and claimed, the description being supplemented by the accompanying drawings.

Figure 1 is a vertical sectional view partly in elevation, showing the blow-head in operative position against the sheet, the edge trimmer however being in an inoperative position.

Figure 2 is a duplicate of Fig. 1 with the exception that it discloses the manner in which the edge trimmer is advanced to operative position after the blow-head comes in contact with the sheet.

In the drawings above briefly described, the numeral 1 designates an appropriate base supporting a die 2 whose upper face is here shown as formed with cavities 3 into which a warm pliable sheet of glass 4 is forced by fluid under pressure, for the purpose of forming any desired character or design upon said sheet. The die 2 is also formed with an opening $2^a$ for a purpose to appear.

The numeral 5 designates a blow-head movable toward and from the die and adapted to contact with the glass sheet 4, so that when fluid under pressure is admitted to said blow-head, said sheet will be forced into conformity with the shape of the die. The sheet and blow-head are of such relative sizes that the ragged edge of the former projects from the latter as shown in Fig. 1 and for the purpose of trimming this edge, I provide an edge trimmer 6 which surrounds the blow-head 5, the cutting edge 7 of this trimmer being normally spaced rearwardly or upwardly from the edge 8 of the blow-head which comes in contact with the glass sheet. Means are provided however whereby the blow-head comes to rest as soon as it strikes the glass sheet, whereas the edge trimmer 6 continues to advance and thus trims the edge of the sheet as will be clear by reference to Fig. 2.

In the present showing, a common actuating means is provided for both the blow-head 5 and the edge trimmer 6, including a tubular plunger or actuator 9 having upper and lower cross heads 10 and 11 slidable upon suitable guides 12 rising from the base 1, a hose or the like 13 being connected with said plunger for supplying fluid under pressure to the interior of the head 5. While any yieldable connection may be employed between the plunger 9 and the head 5 to permit further advancement of said plunger for the purpose of actuating the edge trimmer 6 after said head has come to a standstill against the sheet 4, the construction shown will suffice for illustrative purposes.

At 14, I have shown the head 5 provided with an upstanding hollow boss into which the lower end of the plunger 9 passes slidably, withdrawal of said plunger from the boss however, being prevented by a suitable stop 15 within the boss, which may well be in the form of a nut threaded on the plunger. A coiled spring 16 surrounds the plunger 9 between the cross head 11 and the boss 14 and acts to move the head 5 downwardly when the plunger descends, but at the same time serves to permit further advancement of the plunger when the head has come in contact with the sheet 4. In order that this additional movement of the plunger may be utilized to operate the edge trimmer 6, I have shown a pair of bars 17 rigidly connecting said edge trimmer with the cross head 11.

It will be obvious that any desired means may be employed for operating the plunger 9 and for illustrative purposes, I have shown a pair of pitman rods 18 connected with the ends of the cross head 10 and operated by suitable eccentrics (not shown).

In the preferred form of construction, means are provided whereby the blast of air from the tubular plunger 9 cannot act directly against the glass sheet 4, as this has a tendency to blow a thin spot in the sheet. In the construction shown, a plate 19 is secured to the lower side of the blow-head top and is provided with a depending hollow boss 20 having a plurality of laterally discharging orifices 21. The fluid under pressure must enter the head 5 through these orifices and thus it cannot act directly down upon the sheet 4, but the pressure will be equalized throughout the area of said sheet.

In most instances, particularly when glass letters are being formed, it is desirable that the sheet 4 be provided with an opening to receive an attaching screw or the like and in order that this opening may be formed simultaneously with the blowing operation, I have shown a punch 22 carried by the blow-head, this punch being in the present instance, secured to the center of the boss 20. The opening 2ª above referred to, accommodates the punch when it descends, as clearly shown in the drawing.

By employing the construction shown or a substantial equivalent thereof, a machine is provided which will be highly efficient and reliable for blowing the glass sheet against the die, for trimming the edges of the sheet around the blow-head, and for perforating the sheet where desired.

Obviously, the machine may be constructed in numerous forms, within the scope of the invention as claimed and the present disclosure is for illustrative purposes only.

I claim:

1. A machine of the class described comprising a die for supporting a pliable sheet, a blow-head for application to the sheet to force it into conformity with the die, and an edge trimmer for the sheet surrounding said blow-head.

2. A machine of the class described comprising a die for supporting a sheet of pliable material, a blow-head for application to the sheet, an edge trimmer for the sheet surrounding said blow-head, and means for successively moving said blow-head and said edge trimmer to operative position.

3. A machine of the class described comprising a die for supporting a pliable sheet, a blow-head for application to the sheet to force it into conformity with the die, an edge trimmer for the sheet surrounding said blow-head, and common carrying means for said blow-head and said edge trimmer for moving them to and from operative position.

4. A machine of the class described comprising a die for supporting a pliable sheet, a blow-head for application to the sheet to force it into conformity with the die, an edge trimmer for the sheet surrounding said blow-head, and common carrying means for said blow-head and said edge trimmer for moving them to and from operative position, including yielding means associated with said blow-head for permitting the latter to come to a standstill on the sheet while allowing the edge trimmer to advance beyond said blow-head.

5. A machine of the class described comprising a die for supporting a pliable sheet, a blow-head for application to the sheet to force it into conformity with the die, a movable actuator carrying said blow-head and having a yielding connection therewith permitting further advancement of the actuator when the blow-head reaches the sheet, and an edge trimmer for the sheet operable by said actuator upon the further advancement thereof.

6. A machine of the class described comprising a die for supporting a pliable sheet, a blow-head for application to the sheet to force it into conformity with the die, a movable actuator carrying said blow-head and having a yielding connection therewith permitting further advancement of the actuator when the blow-head reaches the sheet, and an edge trimmer for the sheet connected with said actuator and operable by said further advancement thereof.

7. A machine of the class described comprising a die for supporting a pliable sheet, a blow-head for application to the sheet to force it into conformity with the die, an elongated actuator disposed on a line perpendicular to said die, said blow-head having a hub slidably receiving said actuator, a yielding connection between said actuator and said hub permitting further advancement of the actuator when the blow-head strikes the sheet, and an edge trimmer for the sheet surrounding said blow-head and positively connected with said actuator.

8. In a machine of the class described, the combination of a die for supporting a pliable sheet, and a blow-head for application to the sheet to force it into conformity with the die, said blow-head being provided with a fluid pressure supply, a recess opposite a portion of said sheet and said die, and orifices leading from said fluid pressure supply to said recess, said orifices discharging toward a wall of said blow-head.

9. In a machine of the class described, the combination of a die for supporting a pliable sheet, a blow-head for application to the sheet to force it into conformity with the die, said blow-head being provided with a recess opposite a portion of said sheet and said die and with an internal hollow boss disposed in said recess and formed with laterally discharging orifices, said orifices discharging against a wall of said blow-head, and a fluid pressure supply passage opening into said hollow boss.

10. In a machine of the class described, the combination of a blow-head having an internal hollow boss formed with discharge orifices, a fluid pressure supply passage opening into said boss, and a punch carried by said boss for punching the work to which the blow-head is applied.

11. In a machine of the class described, the combination of a die for supporting a pliable sheet, a blow-head for application to the sheet to force it into conformity with the die, and an internal punch fixed to said blow-head and being operable simultaneously with the latter to punch the work to which said blow-head is applied.

In testimony whereof I have hereunto affixed my signature.

RAYMOND F. HANCOCK.